April 13, 1965   J. J. KAWECKA ETAL   3,178,276
GLASSWARE FORMING APPARATUS
Filed Nov. 14, 1960   5 Sheets-Sheet 2
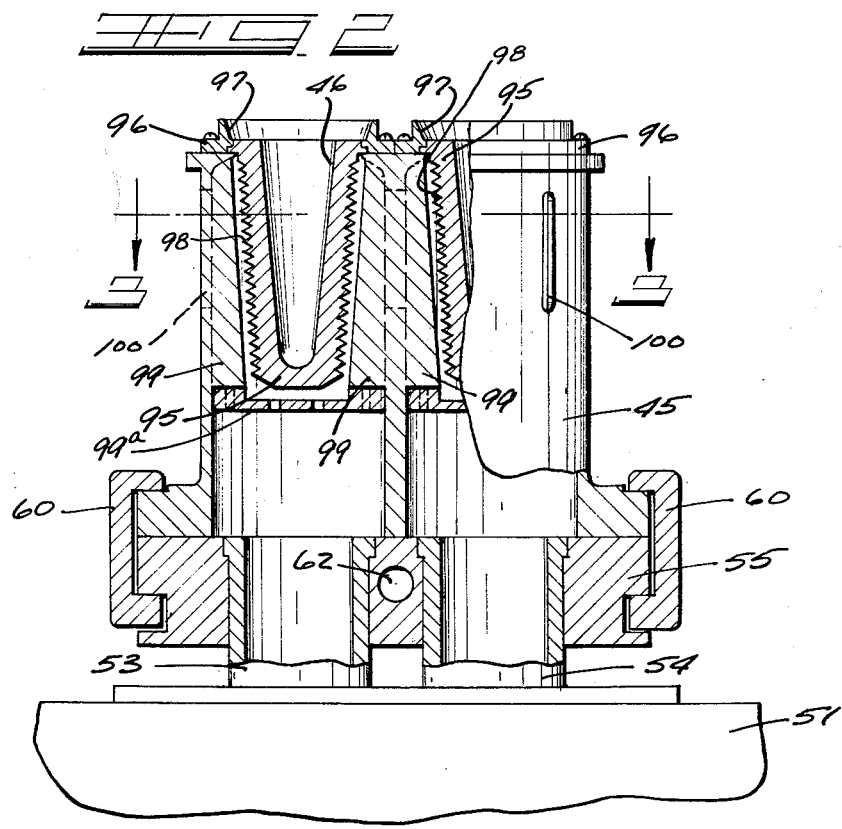
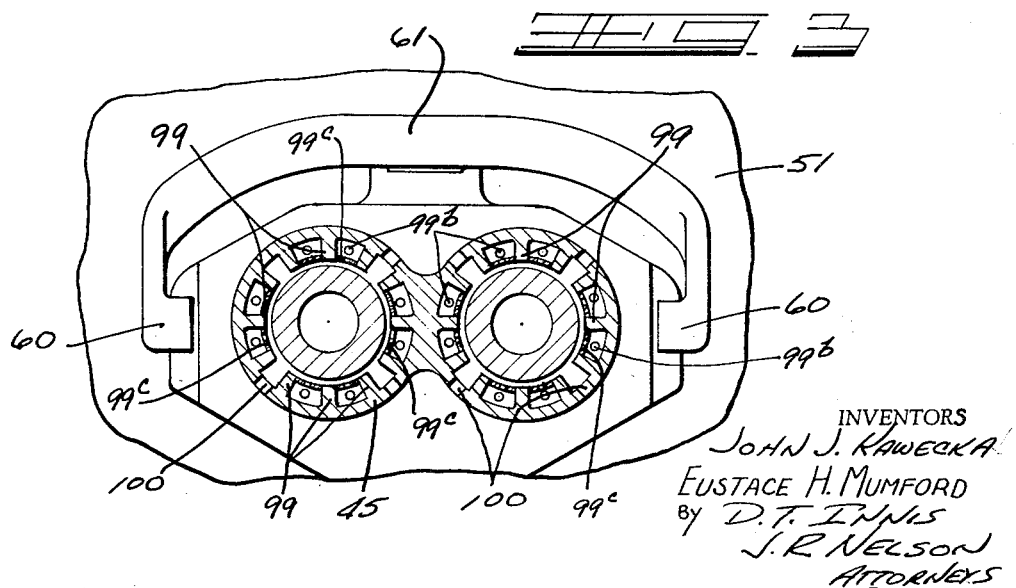
INVENTORS
JOHN J. KAWECKA
EUSTACE H. MUMFORD
BY D. T. INNIS
J. R. NELSON
ATTORNEYS

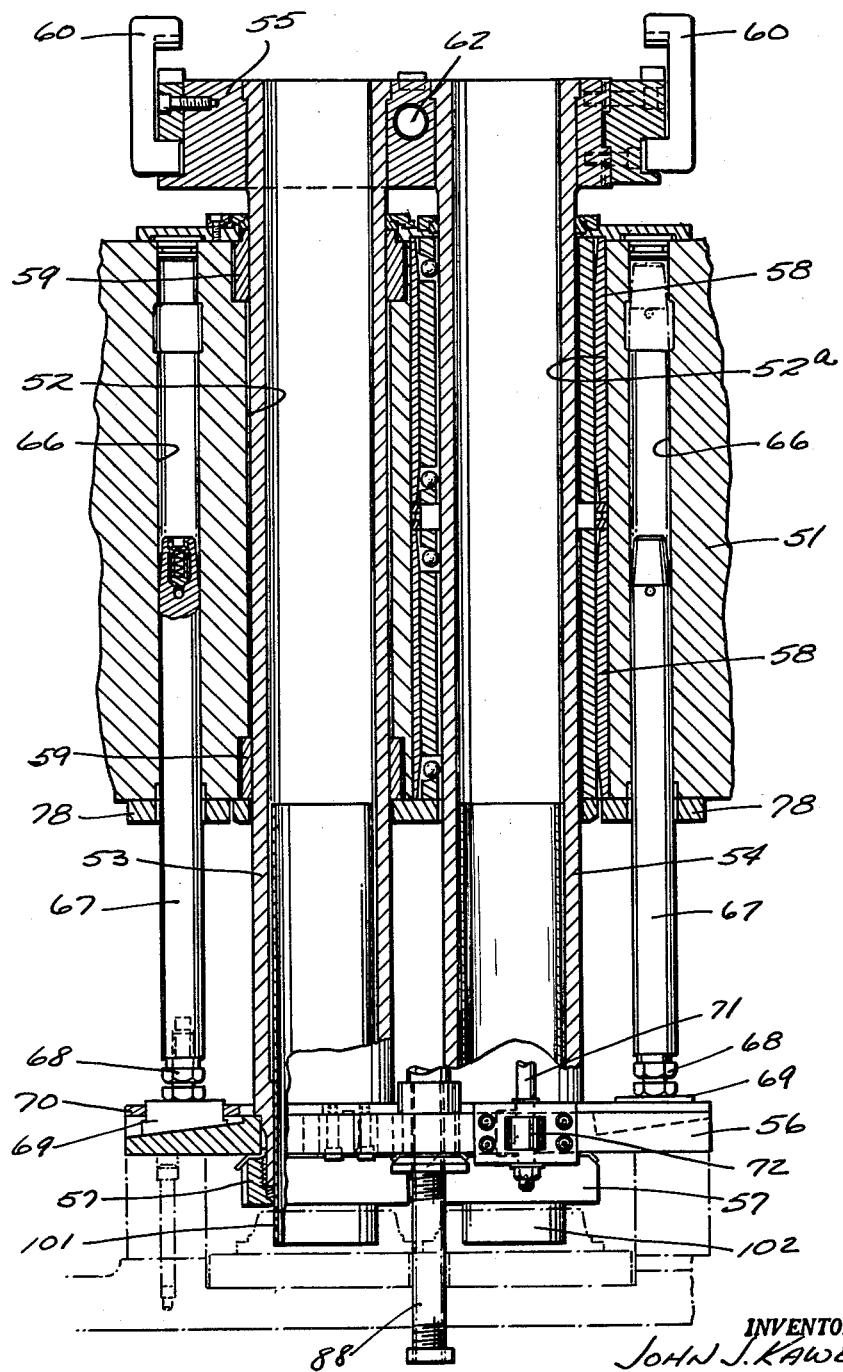

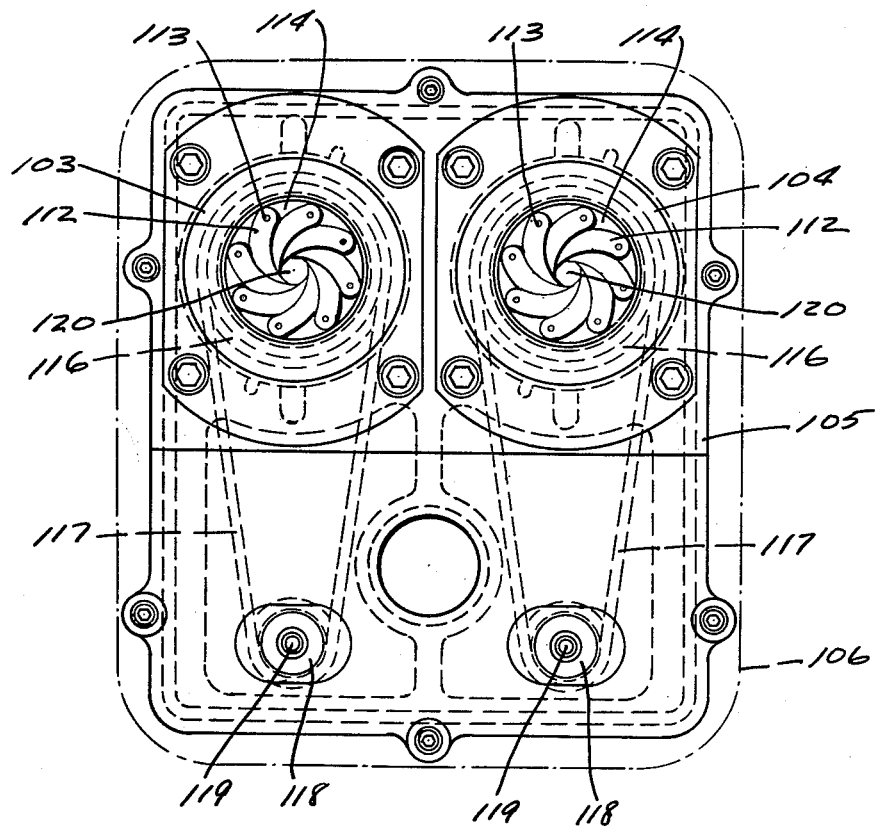

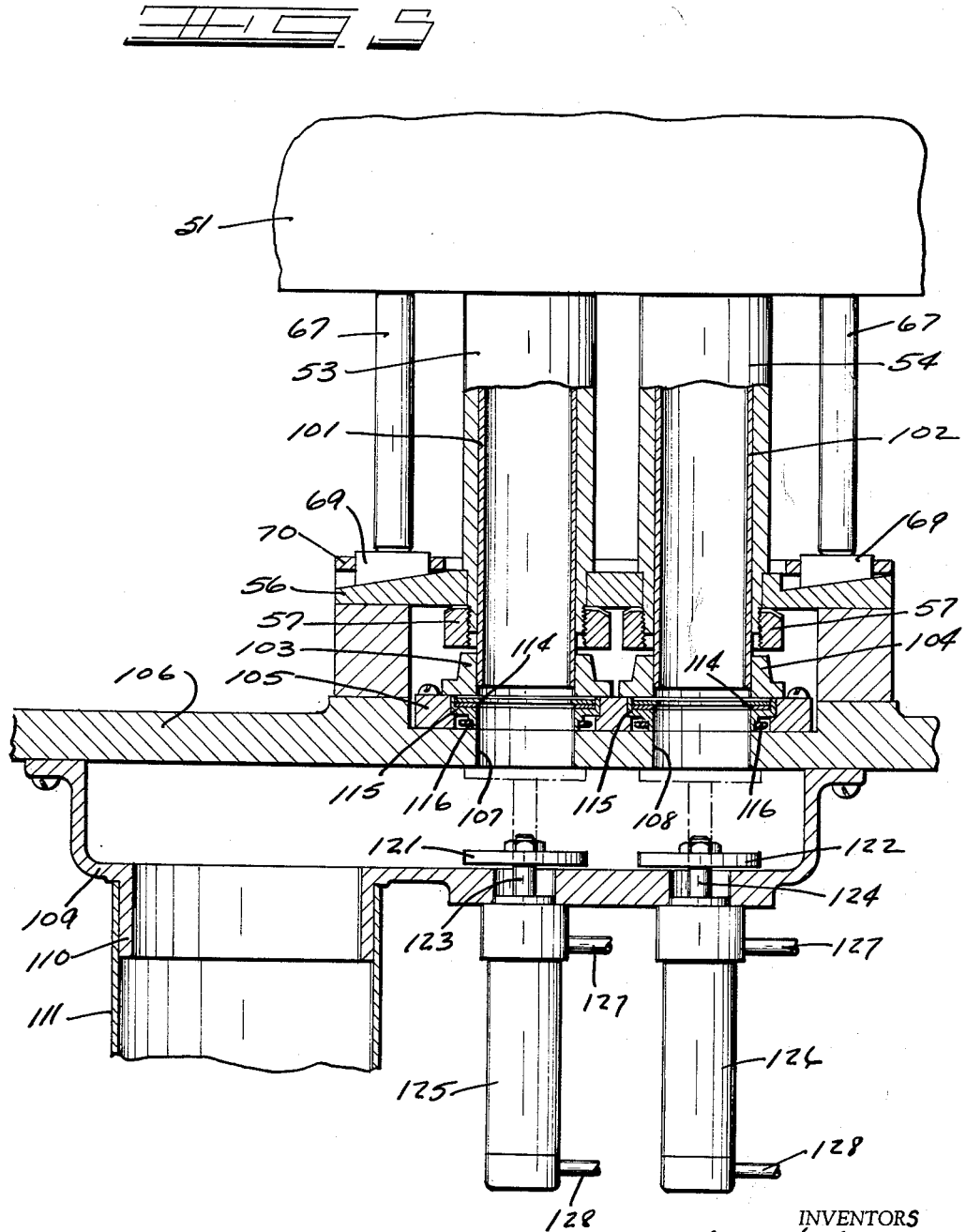

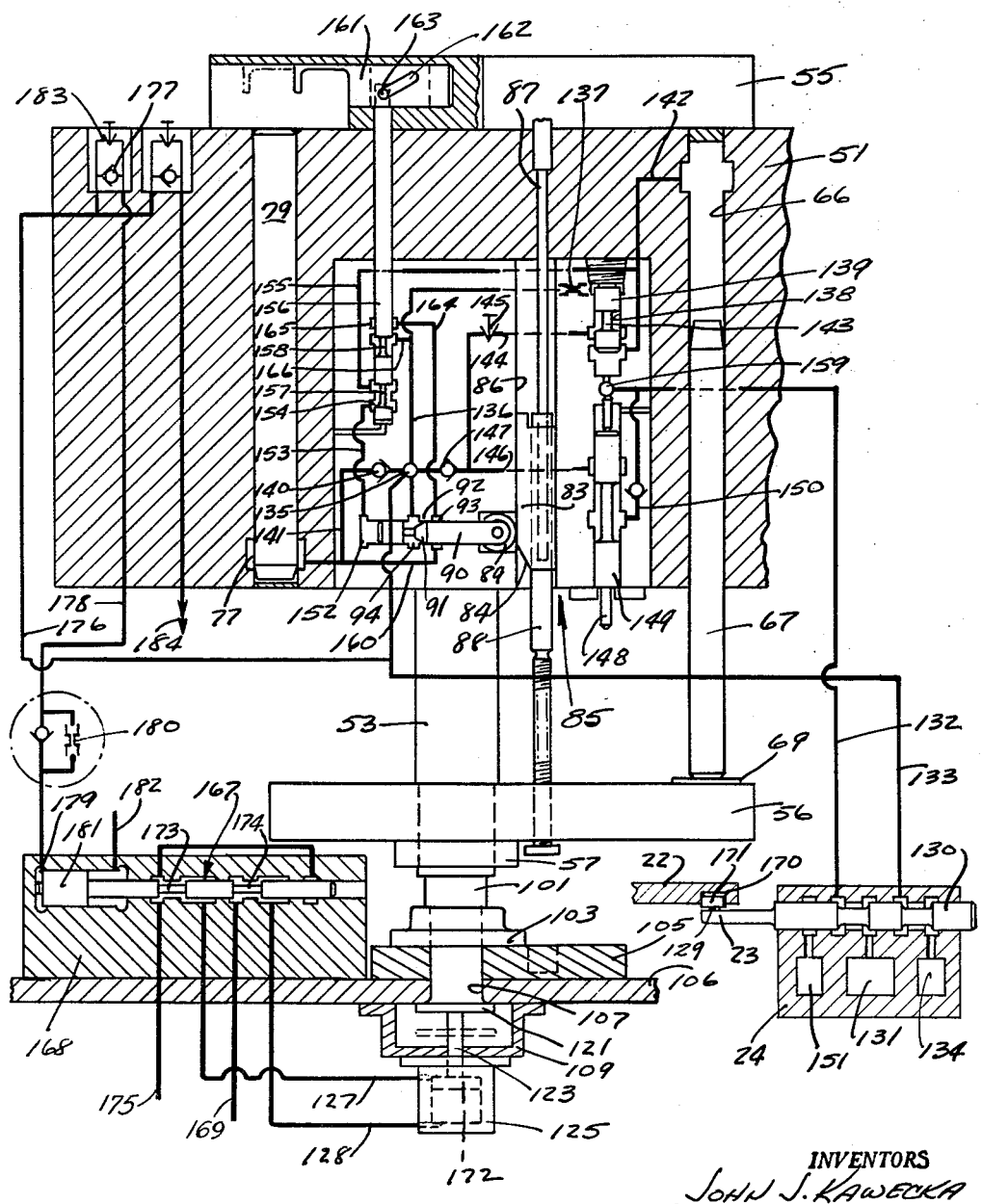

3,178,276
GLASSWARE FORMING APPARATUS
John J. Kawecka, Toledo, Ohio, and Eustace Harold Mumford, Ottawa Lake, Mich., assignors to Owens-Illinois Glass Company, a corporation of Ohio
Filed Nov. 14, 1960, Ser. No. 68,919
3 Claims. (Cl. 65—356)

This invention relates to an apparatus for forming pressed parisons or like articles. More specifically, this invention relates to a mechanism for positioning the parison or blank mold in operative relationship with respect to a neck mold.

In forming machines of the gob fed type wherein the parisons are pressed in an upright position and laterally transferred by neck molds to a position for blowing the parisons to final form, it is necessary to provide a mechanism for raising and lowering the blank molds. Considerable difficulty has been experienced in controlling the rate of movement of the blank molds into and out of pressing position and also in maintaining proper alignment between the parison molds and the neck molds. Furthermore, in order to provide for lateral transfer of the formed parison, it is necessary to lower the blank mold so that the top portion thereof will clear the bottom of the parison which is suspended from the neck molds. Most forming machines are adapted to make various sizes of ware and the parisons will necessarily be of correspondingly variable lengths. Because of this fact, it becomes advantageous to be able to adjust the lowest position reached by the parison molds when they are retracted. This will enable higher speeds of production of the ware through increased indexing speeds for the neck molds.

In forming parisons in the manner described above, the parison mold will become excessively hot unless efficient cooling means are provided therefor. Furthermore, better parisons may be formed when the degree of chill imparted thereto by the parison mold is controllable both as to final temperature of the parisons and the pattern of the chill.

When forming plural parison at the same time, it has been found that the parison molds will run at different temperatures, due to the fact that they will be experiencing different ambient temperature conditions. A contributing factor to the differences of temperature in the parison molds is the fact that double gob feeders will feed gobs of different temperatures. While it is true that an optimum situation would be where the gobs are of the same temperature, as a practical matter this is hard to attain. Furthermore, molds which have been in use for any length of time will have different thermal conductivity characteristics when compared with new molds. Thus, it can be seen that when a single old mold is replaced by a new mold, the molds again will have different operating temperatures. For this reason, it is a distinct advantage to be able to selectively cool the parison molds on an individual basis, thus contributing to uniformity of parison temperatures and consequently more uniform finished ware.

It is an object of this invention to provide apparatus for cooling parison molds at a controlled rate throughout a controlled period of time.

A further object of this invention is to provide apparatus for selectively cooling plural parison molds.

Other objects will be apparent from the following description taken in conjunction with the annexed drawings wherein:

FIG. 1 is a sectional, elevational view of the parison mold supporting structure, with the parison molds removed;

FIG. 2 is a schematic elevation, partly in section, illustrating the positioning of the parison molds on the mold supporting structure;

FIG. 3 is a cross-sectional view taken at line 9—9 on FIG. 2;

FIG. 4 is a schematic plan view of the adjustable valve for controlling the rate of coolant flow to the parison molds;

FIG. 5 is a schematic sectional elevation of the lower part of the parison mold supporting structure and the attached coolant control structure;

FIG. 6 is a schematic diagram of the hydraulic system for controlling the operation of the mold supporting structure.

A main horizontal support structure 51, extending horizontally across the upper portion of the forming machine has a pair of vertical passageways 52 and 52a extending therethrough. Extending vertically through the passageways 52 and 52a are a pair of tubular fluid conducting members 53 and 54 adapted for vertical reciprocation with respect to the support member 51. The upper ends of the tubular members 53 and 54 are joined together by means of an upper crosshead 55 which serves as the main mounting and supporting member for the blank mold holder 45 (see FIG. 3). The lower ends of the tubular members 53 and 54 are also joined together by means of a lower horizontal crosshead 56 (see FIG. 1). The lower crosshead 56 is joined to the tubular members 53 and 54 by means of a pair of threaded locking nuts 57 which are threaded to the lower ends of the tubular members 53 and 54 and retain these members within openings in the lower crosshead 56.

The passageway 52, through which the tubular member 53 extends, has an internal diameter which is greater than the external diameter of the tubular members 53 in order to allow for expansion of the crosshead 55 from heat received from the parison mold 45 during operation of the forming machine.

The vertical passageway 52a through which the tubular member 54 is adapted to be reciprocated has an internal diameter substantially larger than the external diameter of the member 54. The clearance formed by the difference in diameter of the member 54 and the passageway 52a is taken up by a pair of axially aligned sleeve bearings 58 which retain the tubular member 54 in fixed horizontal relationship with respect to the support member 51.

The passageway 52 through which the tubular member 53 extends is provided at the top and bottom with sleeve bearings 59 so as to provide substantially frictionless engagement between tubular member 53 and support 51. As can readily be seen, when the raising and lowering mechanism is in operation for any period of time, the upper crosshead 55 will become heated and since being made of steel, will tend to expand. Therefore, it is necessary to provide clearance between the tubular member 53 and the support 51 in order to prevent binding of the members 53 and 54 in the support 51 during actuation of the raising and lowering mechanism. This expansion is taken care of through the clearance provided between the tubular members 53 and the passageway 52. In order to provide proper orientation of the blank molds with respect to the cooperating neck molds, it is necessary that the blank raising and lowering mechanism have some portion thereof which is always traveling vertically in the same plane. Thus, the sleeve bearings 58 which surround the tubular member 54 restrain the tubular member 54 to precise vertical movement unaffected by thermal expansion of the crosshead 55. Thermal expansion of the crosshead 55 will therefore affect the lateral spacing of the two tubular members 53 and 54 but since the tubular member 54 is embraced by the sleeve bearings 58, expansion will only result in a lateral shift of the tubular member 53 within the passageway 52.

As previously stated, the upper crosshead 55 is adapted to support the parison mold holder 45 (see FIGS. 2 and 3) and to insure that the molds carried thereby are always positioned on the crosshead in the same relative position. A pair of C-shaped clamps 60 are provided at opposite ends of a yoke 61 which may be moved longitudinally with respect to the upper crosshead 55. The main support member 51 is provided with a pair of vertical passages 66 which are closed at their top and serve as operating cylinders for a pair of pistons 67 mounted to reciprocate therein. The pistons 67, at their lower ends, are provided with adjusting screws 68, which are effective to change the length of the pistons. Inasmuch as the pistons 67 operate as a pair, it is necessary that they reach the upper portion of the stroke at the same instant. At the upper end of the stroke, they are snubbed by the entrapment of fluid between the ends of the pistons and the ends of the cylinders. The adjusting screws 68 thus provide an arrangement for insuring that the two pistons 67 will be snubbed at the same time. The pistons 67 abut the lower crosshead 56 through cam blocks 69 which are seated on tapered upper surfaces on the lower crosshead 56.

Application of fluid pressure to the passages 66 will result in downward movement of the pistons 67 and lower crosshead 56. Inasmuch as the lower crosshead 56 is connected to the upper crosshead 55 by means of tubular members 53 and 54, downward movement of the lower crosshead 56 will result in a lowering of the upper crosshead 55 as well. The extent of upward movement of the crossheads 55 and 56 is limited by the fact that the cam blocks 69 will contact the cover plate 78. The pistons 67 will be in the dotted line position shown in FIG. 1 when the crossheads are completely raised. Fine adjustment of the full upward movement of the crosshead may be adjusted by movement of the cam blocks 69 relative to the lower crosshead 56. Cam blocks 69 may be shifted by means of an apertured plate member 70 which overlies and is slidable relative to the lower crosshead 56 and in which cam blocks 69 extend through apertures formed therein.

With particular reference to FIG. 1, shifting of the plate 70 is affected through rotation of a shaft 71 having a worm 72 on the lower end thereof.

This shifting of the plate 70 results in lateral movement of the blocks 69 resulting in a fine adjustment of the blank mold height to effect the gap between the top of the blank molds and the bottom of the neck rings.

As previously mentioned in order to provide parisons which have the desired temperature characteristics, it is necessary to provide means for cooling the parison mold with a controlled amount of coolant. In order to provide adequate, efficient and selective cooling to the parison mold cavities, means are provided for circulating cooling air to the exterior of the parison mold 95. In most instances, there will be an inherent difference in operating temperature between the parison molds 95. This difference in temperature must, therefore, be overcome by providing greater cooling to the mold that is running hotter in relation to the amount of cooling to the other mold.

As best shown in FIGS. 2 and 3, parison molds 95 are suspended from the open upper top of the mold holder 45 and depend downwardly therein with their outer walls spaced from the inner wall of the mold holder 45. The molds 95 are supported in fixed relationship with respect to the holders 45 by means of annular retaining members 96 which overlie the upper edge of the parison molds 95. These annular members 96 also have downwardly and inwardly tapering inner walls 97 which are adapted to cooperate with the neck molds when the parison molds are raised into parison forming position.

As seen in FIG. 2, the parison molds 95 have a tapered shape with numerous heat radiating surfaces 98 formed on the outside surface thereof. In order to direct coolant to these heat radiating surfaces 98 in a predetermined manner, the mold holders 45 have inwardly extending wall portions 99 which define a plurality of cooling air inlet chambers around the outer surfaces of the parison molds 95. Positioned below the parison molds 95 and extending across the openings in the bottom of the mold holders 45, is a horizontal wall member 99a. The horizontal wall member 99a has a series of openings adjacent the center thereof for directing cooling air onto the bottom surface of the parison mold 95. In addition to these openings, the member 99a has a series of openings 99b adjacent the periphery thereof which allow cooling air to flow into vertical chambers formed between adjacent inwardly extending wall portions 99. Extending between the wall portions 99 are perforated plates 99c which allow the air which is delivered through openings 99b to pass through the perforation and impinge on the heat radiating surfaces 98 of the molds 95 in a selected and predetermined pattern. After the air has issued from the perforations in the plates 99c, it will flow out of the mold holders 45 and be exhausted to the atmosphere through a series of elongated slots 100 provided in the walls of the parison mold holders 45 in the area intermediate wall portions 99. Thus, it can be seen that cooling air, as it flows outwardly, will contact the heat radiating surfaces 98 of the parison molds 95 and be exhausted to the atmosphere through the slots 100. By providing such an efficient arrangement, a known amount of cooling may be affected in the parison molds 95. The coolant is supplied to the parison mold holders 45 through the tubular members 53 and 54, which extend through the upper crosshead 55 and are open at their upper ends.

Turning now to FIGS. 4 and 5, there is shown the detailed structure for delivering coolant to the lower ends of the tubular members 53 and 54. Telescopically received within the tubular members 53 and 54 are a pair of sleeves 101 and 102 which are connected to annular connecting members 103 and 104. The connecting members 103 and 104 are mounted on the upper surface of the "iris" type valve housing 105. The valve housing 105 in turn is fixed to the upper surface of a base member 106. The base member 106 has a pair of openings 107 and 108 therethrough which are in axial alignment with the sleeves 101 and 102 respectively.

Mounted below and covering bottom openings 107 and 108 is a plenum chamber 109 having a downwardly extending inlet 110 to which cooling air under pressure is delivered through a pipe 111 from a suitable source of air.

Within the valve housing 105 there is provided two "iris" type valve mechanisms parallel to each other and in coaxial alignment with sleeves 101 and 102. Each valve mechanism is of the iris type wherein a series of spring like blades 112 are arranged in overlapping relationship with one end of each blade 112 being attached to a fulcrum pin 113 mounted in a stationary top ring 114 and with each opposite end provided with a pin arranged in a slideway formed in a lower movable ring 115. Each blade 112 is arcuate in shape, inner radius being at least equal to the radius of the opening through sleeves 101 and 102, and having a length sufficient to permit it to span either of said mentioned sleeve openings. Attached to the lower ring 115 is a sprocket 116. Surrounding the sprocket 116 is a drive chain 117 which is adapted to be driven by a second sprocket 118 connected to shaft 119. Thus, it can be seen that rotation of the shaft 119 will result in rotation of the lower ring 115 in the desired direction about the vertical axis of the sleeves 101 and 102, and the blades 112 will move in accordance therewith to open or close the opening 120 through valve housing 105. These openings 120 are individual to the coolant supplied to the two molds and are adjustable independently of each other to provide means for controlling the rate of flow of coolant to the parison mold holders 45. In addition to this control, there is provided means for cutting off the air between the plenum chamber 109 and the valve housing 105. This means takes the form of a pair of flat, disc-like, valve bodies 121 and 122 which are adapted to close the openings 107 and 108 in the base 106. The valve bodies 121 and 122 are mounted on vertical shafts 123 and 124 which form the output shafts of two fluid motors 125 and 126. A pair of fluid inlets 127 and 128 are connected to each fluid motor 125 and 126 for alternate actuation to raise and lower the valve bodies 121 and 122.

The operation of the various mechanisms at the pressing station will now be described with reference to the schematic diagram, FIG. 6.

At the right side of FIG. 6, there is schematically shown a portion of cam 22 having an undercut slot 170 in the lower surface thereof in which a roller 171 is adapted to ride. Roller 171 is connected by a pin 129 to cam follower 23 which in turn is connected to a spool valve 130. Rotation of cam 22 will result in reciprocatory movement of the spool valve 130 in the valve block 24. The spool valve 130 is effective to apply fluid under pressure from a pressure chamber 131 alternately to two conduits 132 and 133. For example, as shown in FIG. 6, chamber 131 is in communication with conduit 132 while conduit 133 is in communication with an exhaust chamber 134. In this position delivery of fluid under pressure to conduit 132 will result in a downward movement of the crosshead 56 to the position shown.

A description now will be given of what occurs when spool valve 130 is shifted by cam 22 to the left, as viewed in FIG. 6.

Hydraulic fluid or oil under pressure will flow from the chamber 131 into conduit 133 and then a junction point 135 wherein the fluid divides and flows in two directions. From the junction point 135, oil flows through a conduit 136 and a flow restrictor 137 to the top of a chamber 138 resulting in forcing a piston 139 downward. At the same time, oil is flowing from the junction point 135 past a check valve 140 in a conduit 141 which opens into passageway 77, forcing the pistons 79 in an upward direction. As the piston 79 moves upward, raising the crossheads 55 and 56, oil that is trapped in passageways 66 will be forced therefrom by upward movement of the pistons 67. This oil will flow out through a conduit 142 past an undercut portion 143 of the piston 139 and through a conduit 144. In the conduit 144 is a throttle valve 145 for controlling the rate of flow of fluid from passageway 66, thus controlling the rate of upward movement of crossheads. After passing the throttle valve 145, the oil flows from conduit 144 to conduit 146, through a check valve 147 to the junction point 135, where the oil will be utilized for raising the pistons 79.

As previously explained, the diameters of the two pistons 67 and 79 (actually pairs of pistons 67 and 79) are different, with the diameter of pistons 67 being less than that of pistons 79. Therefore, the pressure in passageway 66 will be at a higher level than that in the passageway 77. This pumping of oil from the passageway 66 to the passageway 77 results in a saving of oil on the upstroke, thus requiring the use of a relatively small capacity pump for supplying fluid under pressure to chamber 131 to affect upward movement of the crossheads. At the end of the upstroke, the lower crosshead 56 will strike a downwardly extending pin 148 attached to a vertically movable valve 149. The upward movement of the valve 149 will connect conduit 146 to conduit 150 which is connected to conduit 132. At this time, conduit 132 is connected to exhaust chamber 151 in the valve block 24. Thus, it can be seen that oil flowing from the passageway 66 will be exhausted through conduits 144 and 146, 150 and 132. When the oil from passageway 66 goes to exhaust, there is no downwardly directed force on the crossheads and the available fluid pressure from chamber 131 will be fully utilized to maintain the crossheads in their upper position.

As the lower crosshead 56 is raised, it carries with it cylindrical member 88 and the cam element 83 which will slide vertically in the slot 86. The square shaft 87 during upward movement of the cam element 83 and cylindrical member 88, will telescope within the cylindrical member 88. As the cam element 83 moves vertically, the roller 89 will move to the right, as viewed in FIG. 6, following the cam surface 84 and move the valve element 90 to the right. The valve element 90 and roller 89 are biased toward the right by the introduction of fluid under pressure to a chamber 152. Pressurized fluid reaches the chamber 152 through conduit 153, a valve chamber 154 and a conduit 155 which is connected to conduit 142. Thus, the valve 90 will move to the right upon upward movement of the lower crosshead 56. Within the valve chamber 154 is a manually shiftable spool valve 156 having two undercut portions 157 and 158, with the portion 157 being positioned in the previously mentioned chamber 154.

In order to retract the crossheads 55 and 56, the spool valve 130 is positioned as shown in FIG. 6, with the conduit 132 connected to pressure chamber 131 and conduit 133 is connected to exhaust chamber 134. Fluid under pressure will be delivered through conduit 132 to junction point 159 and beneath piston 139 causing the piston to be raised to the position shown in FIG. 6. With the piston 139 in the position shown, oil will flow into conduit 142 connected to the passageway 66 and resulting in forcing piston 67 in a downward direction. As the piston 67 moves downwardly, it forces lower crosshead 56 down and by reason of the connection of tubular members 53 and 54, will also force the upper crosshead 55 downward. As the upper crosshead 55 moves down, it will force piston 79 downwardly in passageway 77. The fluid within passageway 77 is forced out through a conduit 160 and into chamber 93 surrounding valve 90.

At this time, the valve 90 is positioned to the right and allows the fluid in chamber 93 to flow into chamber 94 which is connected to junction point 135. After the fluid has reached the junction point 135, it will flow through conduit 133 to the exhaust chamber 134. As the crossheads 55 and 56 move downwardly, the lower crosshead 56 will bring the cam element 83 downward and as the cam surfaces 84 engage the roller 89, the valve 90 will be moved to the left, as is viewed in FIG. 6.

At this time, the flow of fluid from the chamber 93 to chamber 94 will be snubbed by the tapered surfaces 91 of the valve element 90. Further downward movement of cam element 83 shifts the valve element 90 to completely cut off communication between chambers 93 and 94, thus trapping fluid within the passageway 77 and preventing further downward movement of the crossheads 55 and 56. Thus, it can readily be seen that vertical adjustment of the cam element 83 relative to the lower crosshead 56 will determine the extent of retraction of the crosshead 55 which carries the parison mold holders 45. Whenever it is desirable to have constant full retraction of the crossheads 55 and 56, the valve 156 is shifted manually by moving a slide 161 to the left. Slide 161 carries an annular slot 162 within which a pin 163 will ride. The pin 163 is connected to the upper end of valve 156. The upward shifting of valve 156 will allow fluid exhausting from the passageway 77 to flow from chamber 93 through a conduit 164 connected to a chamber 165 through which valve 156 is movable. The oil will flow from chamber 165 past an undercut portion 158 of valve 156 to the junction point 135 through a conduit 166.

The admission of cooling air to the tubular members 53 and 54 is under the control of a spool valve 167 which is slidable in a valve block 168. The spool valve 167 will regulate the admission of air from supply conduit 169 alternately to conduits 127 and 128, and alternately shift the piston 172 of the motor 125. This shifting of the piston 172 will result in forcing the valve body 121 either into or out of sealing engagement with the opening 107 in the base member 106. As shown in FIG. 6, the spool valve 167 has two undercut portions 173 and 174 with the undercut portion 174 providing the clearance for fluid to pass from the supply line 169 to either conduits 127 or 128 depending upon its shifted position.

The undercut portion 174 of spool valve 167 will control the admission of air from inlet 169 to conduit 128 while at the same time undercut portion 173 allows conduit 127 to be exhausted through an exhaust port 175. Shifting of the valve 167 to the right will have the effect of connecting inlet 169 to conduit 127 by way of the undercut portion 173 of the valve 167. At the same time conduit 128 will be connected to exhaust through exhaust port 175 by way of undercut portion 174 of the valve 167.

As shown in FIG. 6, the spool valve 167 is in the position shown during retraction of the crossheads 55 and 56. At this time the cooling air within plenum chamber 109 is prevented from entering the sleeve 101. When the main cam controlled spool valve 130 is shifted to the left for admitting oil under pressure to conduit 133, oil under pressure is also fed through a conduit 176 which is connected through a check valve 177 to an inlet conduit 178. The conduit 178 is connected to a chamber 179 at one end of the valve 167, through a flow restrictor 180 and results in shifting the spool valve 167 to the right.

As shown in FIG. 6, the spool valve 167 is moved to the right by the introduction of oil under pressure to the chamber 179. Within the chamber 179 is a piston member 181 which is integral with the spool valve 167. When the main cam controlled spool valve 130 is shifted so as to introduce oil under pressure to line 132, for effecting the downward movement of the crossheads 55 and 56, the other conduit 133 leading to the valve 174 is connected to exhaust port 134 at the same time the left-hand end of chamber 179 will also be connected to the exhaust side of the main valve block 24. The piston 181 is normally biased toward the left by a constant pressure source connected through a conduit 182 to the right-hand end of the chamber 179. This will effect return of the piston to the left and the fluid trapped within the chamber 179 will be exhausted through the line 178 and through a needle valve 183 which is connected in parallel with the check valve 177 and then by way of the conduit 176 to conduit 133 and to the exhaust chamber 134.

While the above description has been limited to the cycling of coolant to the sleeve member 53, it should be understood that there is a duplicate system for controlling the communication of coolant to the sleeve member 54. This duplicate system is connected to a line 184 which leads to a spool valve similar to the valve 167 shown in FIG. 6. The functional relationship of this pilot valve to the mechanism for raising and lowering the blanks will be the same as that of valve 167. The shut off valve 122, similar to valve body 121, will be operated with respect to the opening 108 (FIG. 5) in the bottom of the base member 106 coincident with the operation of valve body 121.

Thus it can be seen that applicant has provided apparatus capable of raising and lowering the blank or parison molds at the parison forming station which is capable of a high degree of flexibility both as to cooling of the molds themselves and to the mechanics involved in raising and lowering the blank mold. The range of adjustability of the extent of retraction of the blank molds after the parisons have been pressed is advantageous from the standpoint of the speed of operation of the forming machines disclosed herein.

Modifications may be resorted to within the spirit and scope of the appended claims.

We claim:
1. Apparatus for positioning and conditioning a dual cavity parison mold in parison pressing position, comprising a stationary support structure, a pair of crossheads, one crosshead being positioned above said structure adapted to carry said parison molds, the other crosshead being positioned below said structure, a pair of parallel rigid fluid conducting means, said conducting means being connected at their ends to said crossheads, a pair of vertical cylindrical openings through said structure, said conducting means extending through said openings, annular bearing means within one said opening and surrounding one of said conducting means for confining said conducting means therein to axial linear movement, split sleeves surrounding said other conducting means and retained in the other said opening at the ends thereof, said other opening being large enough to accommodate expansion of said crossheads and consequent lateral displacement of the axes of said conducting means, a supply of coolant, means connecting said coolant supply to the lower end of each said conducting means, valve means interposed in said connecting means, means for individually adjusting the volume rate of flow of coolant to each said conducting means, and means operative in timed sequence for opening and closing said valve means.

2. The apparatus as defined in claim 1 wherein said coolant supply connecting means comprises a base member having a pair of openings therein in coaxial alignment with the lower ends of said conducting means, a pair of cylindrical sleeves fixed in said openings and telescopically received within said conducting means, a plenuum chamber mounted on said base in underlying relationship to said openings, and a coolant supply conduit connected to said plenum chamber.

3. The apparatus as defined in claim 2 wherein said valve means comprises a pair of reciprocating hydraulic motors mounted on said chamber, the axes of said motors being in alignment with the respective openings in the base member, an operating rod of each motor extending into said plenum chamber and a flat, disc-like valve member connected to each rod whereby said valve member, upon actuation of its motor, will be moved into closing relationship with respect to the opening in said base to cut off the communication of air in the chamber from the fluid conducting means.

References Cited by the Examiner

UNITED STATES PATENTS

| | | | |
|---|---|---|---|
| 443,403 | 12/90 | Neville | 65—356 |
| 771,763 | 10/04 | Bournique | 65—227 |
| 1,057,198 | 3/13 | Winder | 65—356 |
| 2,324,149 | 7/43 | Gray | 65—305 X |
| 2,382,052 | 8/45 | Gray | 65—216 |
| 2,508,891 | 5/50 | Rowe | 65—356 X |
| 2,637,944 | 5/53 | Claughsey | 65—246 |
| 2,702,444 | 2/55 | Rowe | 65—167 |
| 2,751,715 | 6/56 | Denman | 65—356 |
| 2,837,872 | 6/58 | Brymer | 65—159 |
| 2,901,865 | 9/59 | McCormick | 65—356 |
| 2,950,816 | 8/60 | Arenz | 65—355 X |

DONALL H. SYLVESTER, *Primary Examiner.*

ARTHUR P. KENT, MORRIS O. WOLK, *Examiners.*